F. P. SHERONAS.
TOW ROD.
APPLICATION FILED MAY 18, 1921.
1,433,486.
Patented Oct. 24, 1922.
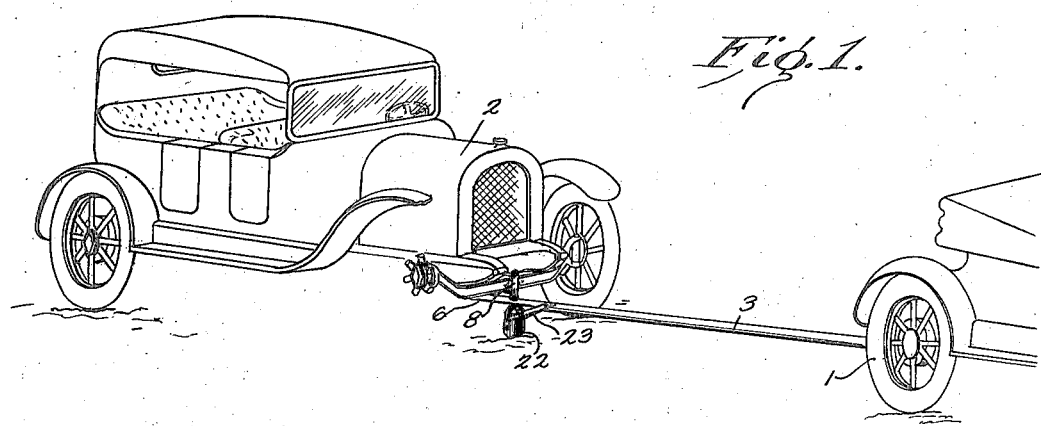
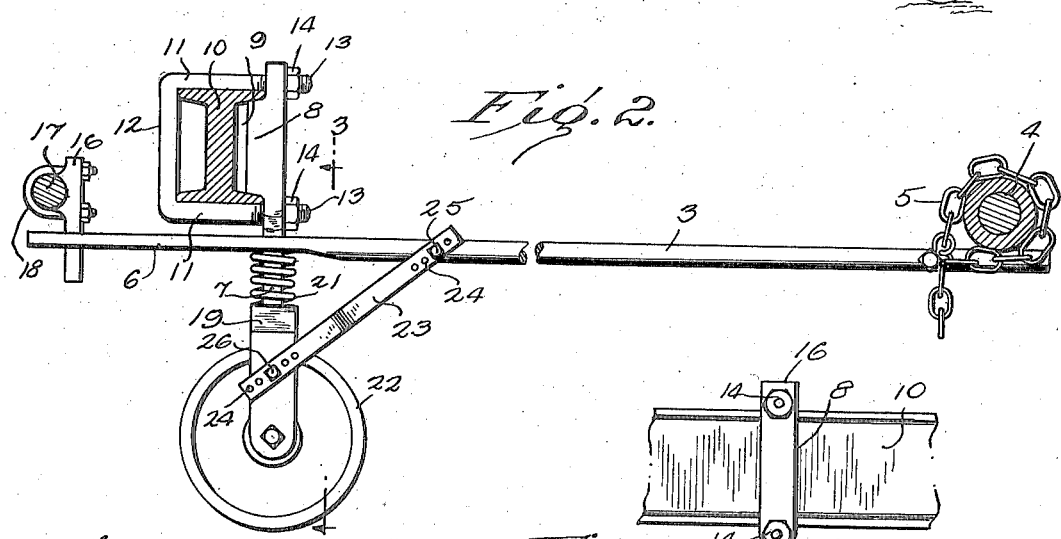
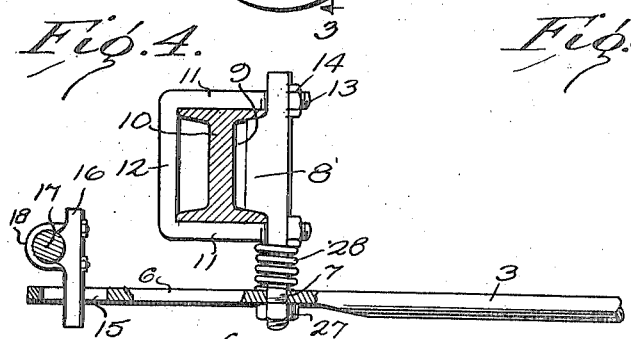
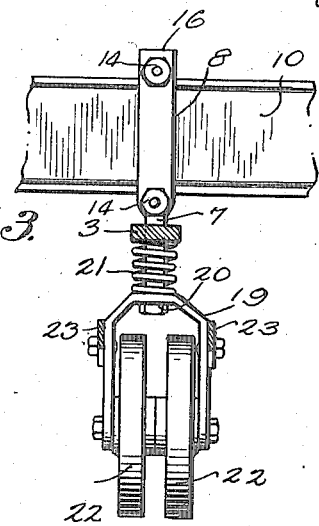
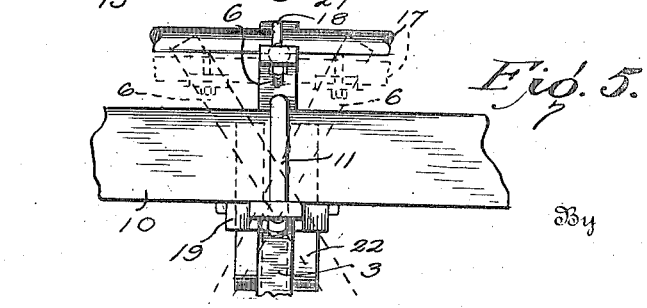
Inventor
F. P. SHERONAS
By
Ch. Parllen Attorney Patented Oct. 24, 1922.

1,433,486

UNITED STATES PATENT OFFICE.

FRANK P. SHERONAS, OF NEW HAVEN, CONNECTICUT.

TOW ROD.

Application filed May 18, 1921. Serial No. 470,665.

*To all whom it may concern:*

Be it known that I, FRANK P. SHERONAS, a citizen of the United States, residing at New Haven, in the county of New Haven and State of Connecticut, have invented certain new and useful Improvements in Tow Rods, of which the following is a specification.

This invention relates to tow rods, and more particularly to tow rods having means for engaging the steering rod of a towed vehicle.

An object of the present invention is to provide a tow rod by means of which the towing vehicle may be connected to a towed vehicle and the towed vehicle steered in accordance with the changes in direction in the towing vehicle, thus eliminating the necessity of an operator in the towed vehicle to steer it independently.

A further object of the invention is to provide a device of this character having an emergency wheel for use in connection with a towed vehicle having a broken front wheel.

In the accompanying drawings, I have shown several embodiments of the invention. In this showing:

Figure 1 is a perspective view of the device applied,

Figure 2 is a side elevation,

Figure 3 is a vertical sectional view on line 3—3 of Figure 2,

Figure 4 is a side elevation of a portion of a modified form, and,

Figure 5 is a plan view thereof.

Referring to the drawings, the reference numeral 1 designates the towing vehicle and 2 the towed vehicle. The towing device comprises a rigid rod 3, formed of any suitable material, and provided with means for securing it to the towing vehicle. As shown, the rod is secured to the rear axle 4 of the towing vehicle by means of a chain 5, which is wrapped around the axle and secured in any suitable manner. The provision of a flexible chain for securing the tow rod to the towing vehicle is advantageous, in that it permits the rod to be secured to an accessible part of the rear of the vehicle. The opposite end of the tow rod is flattened, as at 6, and is provided with an opening for the reception of a bolt or pin 7. The upper end of the bolt or pin is provided with an offset 8, adapted to enter the recess 9 of the front axle 10. It is further provided with openings for the reception of arms 11 of a substantially U-shaped clip 12, surrounding the other three sides of the axle, the outer end of the arms being threaded, as at 13, for the reception of suitable fastening elements 14. Beyond the bolt, the flattened portion 6 of the tow rod is provided with an elongated slot 15, for the reception of a pin 16, secured to the steering rod 17 of the vehicle. The supporting pin 16 may be secured to the steering rod in any suitable manner, as by clips 18.

In the form of the invention shown in Figures 1 to 3 of the drawings, the bolt 7 is extended a desired distance beneath the tow rod and is adapted to receive a bearing member 19, the bearing member being provided with an opening for the passage of the bolt whereby it is freely mounted to revolve around the bolt, as a center. A nut 20 may be arranged on the end of the bolt to retain the bearing member in position and a spring 21 may be arranged between the tow rod and the bearing member for cushioning purposes. A pair of rollers 22 are mounted on the shaft arranged in the arms of the bearing member. The bearing member is connected to the tow rod by means of yokes or straps 23, one strap being employed on each side of the bearing member. The straps are provided with a plurality of openings 24, adjacent each end to permit them to be secured to the tow rod and bearing member, as at 25 and 26. The provision of a plurality of openings permits the straps to be adjusted to take up wear and eliminate rattling.

In the form of the invention shown in Figures 4 and 5 of the drawings, the emergency wheels 22 are eliminated. In this form of the invention, the bolt 7 terminates below the tow rod and is threaded for the reception of a nut 27. A coil spring 28 is arranged between the tow rod and the lower arm 11 of the clip 12.

In operation, the form of the invention shown in Figures 1 to 3 of the drawings is employed when one of the front wheels of the towed vehicle is damaged or has been removed. As the towing vehicle turns, the towing rod swings about the bolt 7 as a pivot and moves the steering rod 17 of the towed vehicle to one side, as illustrated in dotted lines in Figure 5 of the drawings, thus turning the wheel of the rear vehicle in the same direction that the front vehicle turns, and steering the rear vehicle. At the same time, the bearing member 19 is turned in the same direction by the straps 23, connected to the tow rod and the bearing member. The provision of spring 21 serves to cushion shocks and jars transmitted from the emergency wheels 22 to the vehicle.

In the form of the invention shown in Figures 4 and 5 of the drawings, the operation is the same except that the tow rod is employed with a vehicle having four wheels. When the front vehicle turns in a given direction, the tow rod, through the supporting pin 16, moves the steering rod 17 in the proper direction to turn the front wheels to the towed vehicle in the same direction and thus steer it.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. A towing device comprising a bracket adapted to be secured to the front axle of a towed vehicle, a bolt secured to said bracket and extending therefrom, a tow rod pivotally mounted on said bolt, means for securing one end of said tow rod to the towing vehicle, means for securing the other end of the tow rod to the steering rod of the towed vehicle, and an emergency wheel supported on said bolt and connected to the tow rod to turn therewith.

2. A towing device comprising a bracket adapted to be secured to a towed vehicle, a bolt extending from said bracket, a tow rod pivotally mounted on said bolt, means for securing one end of said tow rod to the towing vehicle, means for connecting the other end of the tow rod to the steering rod of the towed vehicle to actuate said steering rod when the tow rod turns on its pivot, a bearing member mounted to revolve on said bolt, an emergency wheel carried by said bearing member, and connections between said bearing member and said tow rod to control the turning of the bearing member.

3. A towing device comprising a bracket adapted to be secured to a towed vehicle, a bolt extending from said bracket, a tow rod pivotally mounted thereon, means for connecting the tow rod to the towing vehicle, means for connecting one end of said tow rod to the steering rod of the towed vehicle, a bearing member mounted on said bolt, a coil spring arranged between said bearing member and said tow rod and surrounding said bolt, an emergency wheel mounted in said bearing member, and connections between said bearing member and said tow rod.

In testimony whereof I affix my signature in presence of two witnesses.

FRANK P. SHERONAS.

Witnesses:
ROBERT J. WOODRUFF,
HELEN W. BUTLER.